United States Patent
Hong et al.

(10) Patent No.: US 11,641,648 B2
(45) Date of Patent: May 2, 2023

(54) DEVICE AND METHOD FOR TRANSMITTING UPLINK CONTROL SIGNAL IN WIRELESS COMMUNICATION SYSTEM

(71) Applicant: Samsung Electronics Co., Ltd., Suwon-si (KR)

(72) Inventors: Sungnam Hong, Suwon-si (KR); Yongok Kim, Seoul (KR); Chanhong Kim, Suwon-si (KR); Yeohun Yun, Hwaseong-si (KR); Jongbu Lim, Seoul (KR); Taeyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

(21) Appl. No.: 16/645,440

(22) PCT Filed: Sep. 7, 2018

(86) PCT No.: PCT/KR2018/010462
§ 371 (c)(1),
(2) Date: Mar. 6, 2020

(87) PCT Pub. No.: WO2019/050315
PCT Pub. Date: Mar. 14, 2019

(65) Prior Publication Data
US 2020/0288457 A1    Sep. 10, 2020

(30) Foreign Application Priority Data
Sep. 8, 2017 (KR) .................. 10-2017-0115300

(51) Int. Cl.
*H04W 72/21* (2023.01)
*H04L 1/1812* (2023.01)
*H04W 72/0453* (2023.01)

(52) U.S. Cl.
CPC ........... *H04W 72/21* (2023.01); *H04L 1/1812* (2013.01); *H04W 72/0453* (2013.01)

(58) Field of Classification Search
CPC .......... H04W 72/0413; H04W 72/0453; H04L 1/1812; H04L 5/0055; H04L 5/0007; H04L 1/1864; H04L 1/1861; H04L 5/001
See application file for complete search history.

(56) References Cited

U.S. PATENT DOCUMENTS 8,665,813 B2 * 3/2014 Golitschek Edler Von Elbwart ................ H04L 1/0026
370/329
9,237,596 B2 * 1/2016 Kwon .................... H04W 76/27
(Continued)

FOREIGN PATENT DOCUMENTS

KR    10-2011-0065329 A    6/2011
KR    10-2011-0100574 A    9/2011
(Continued)

OTHER PUBLICATIONS

ISA/KR, International Search Report and Written Opinion of the International Searching Authority, International Application No. PCT/KR2018/010462, dated Dec. 13, 2018, 13 pages.
(Continued)

*Primary Examiner* — Hanh N Nguyen

(57) ABSTRACT

The present disclosure relates to a pre-$5^{th}$-Generation (5G) or 5G communication system to be provided for supporting higher data rates beyond $4^{th}$-Generation (4G) communication system such as long-term evolution (LTE). The present disclosure is for transmitting an uplink control signal in a wireless communication system, an operating method of a terminal comprises receiving information notifying an indication scheme relating to a carrier for transmission of uplink control information and receiving subcarrier for the trans-
(Continued)

mission of the uplink control information according to the indication scheme.

12 Claims, 14 Drawing Sheets

(56) References Cited

U.S. PATENT DOCUMENTS

| | | | |
|---|---|---|---|
| 9,839,036 B2* | 12/2017 | Xue | H04L 5/006 |
| 10,270,570 B2* | 4/2019 | Liu | H04L 5/0078 |
| 2011/0159867 A1 | 6/2011 | Kuo | |
| 2012/0213187 A1 | 8/2012 | Yang et al. | |
| 2012/0243499 A1 | 9/2012 | Moon et al. | |
| 2013/0028149 A1* | 1/2013 | Chen | H04L 5/0005 370/280 |
| 2013/0064193 A1 | 3/2013 | Moon et al. | |
| 2013/0279363 A1* | 10/2013 | Huang | H04W 24/10 370/252 |
| 2015/0055521 A1 | 2/2015 | Seo et al. | |
| 2017/0302419 A1* | 10/2017 | Liu | H04L 5/0082 |
| 2018/0020443 A1 | 1/2018 | Lee et al. | |
| 2019/0052503 A1* | 2/2019 | Hayashi | H04L 5/0046 |
| 2019/0116570 A1* | 4/2019 | Kishiyama | H04W 8/00 |
| 2020/0022175 A1* | 1/2020 | Xiong | H04W 72/0453 |

FOREIGN PATENT DOCUMENTS

| | | |
|---|---|---|
| KR | 10-2017-0095275 A | 8/2017 |
| WO | 2011052961 A2 | 5/2011 |
| WO | 2013151394 A1 | 10/2013 |

OTHER PUBLICATIONS

Korean Intellectual Property Office "Notice of Preliminary Rejection" dated Jan. 21, 2022, in connection with Korean Patent Application No. 10-2017-0115300, 10 pages.
Nokia et al., "On NR carrier aggregation" 3GPP TSG-RAN WG1 Meeting #88b, R1-1705249, Spokane, WA, USA, Apr. 3-7, 2017, 8 pages.
Intel Corporation, "Scheduling and UCI feedback for carrier aggregation" 3GPP TSG-RAN WG1 NR Ad-Hoc #2, R1-1710578, Qingdao, P.R. China, Jun. 27-30, 2017, 5 pages.
Huawei et al., "On uplink data scheduling", 3GPP TSG RAN WG1 Meeting #89, May 15-19, 2017, R1-1706909, 3 pages.
Huawei et al., "Initial access and uplink operations with SUL", 3GPP TSG RAN WG1 Meeting #90, Aug. 21-25, 2017, R1-1712165, 6 pages.
Notice of Preliminary Rejection dated Jul. 26, 2022 in connection with Korean Patent Application No. 10-2017-0115300, 11 pages.
Huawei et al., "TDM of LTE and NR uplinks for LTE-NR dual connectivity", 3GPP TSG RAN WG1 Meeting #90, Aug. 21-25, 2017, R1-1712163, 7 pages.
Notice of Patent Grant dated Jan. 20, 2023 in connection with Korean Patent Application No. 10-2017-0115300, 5 pages.

* cited by examiner

DEVICE AND METHOD FOR TRANSMITTING UPLINK CONTROL SIGNAL IN WIRELESS COMMUNICATION SYSTEM

CROSS-REFERENCE TO RELATED APPLICATIONS

This application is a 371 National Stage of International Application No. PCT/KR2018/010462, filed Sep. 7, 2018, which claims priority to Korean Patent Application No. KR 10-2017-0115300, filed Sep. 8, 2017, the disclosures of which are herein incorporated by reference in their entirety.

BACKGROUND

1. Field

The present disclosure relates to a wireless communication system, and more particularly, to an apparatus and a method for transmitting an uplink control signal in the wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'beyond 4G network' or a 'post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The 5G communication system is developing a carrier aggregation (CA) technique for the purpose of average throughput increase, performance enhancement of a terminal outside a cell, and delay time reduction. In addition, a technique operable by applying a different subcarrier spacing to each carrier is under development. Also, to guarantee high-reliability transmission and reception, the 5G communication system is discussing application of a hybrid automatic repeat and request (HARD) technique, similar to the 4G system. Thus, the 5G communication system requires HARQ-related procedures adequate to its characteristic.

SUMMARY

Based on the discussions described above, the present disclosure provides a method and an apparatus for effectively transmitting an uplink control signal in a wireless communication system.

In addition, the present disclosure provides a method and an apparatus for statically, dynamically, or semi-statically indicating a carrier for transmitting a control channel among a plurality of carriers for carrier aggregation (CA) in a wireless communication system.

In addition, the present disclosure provides a method and an apparatus for activating or deactivating a mode for dynamically indicating to a terminal a carrier for transmitting a control channel among a plurality of carriers for CA in a wireless communication system.

In addition, the present disclosure provides a method and an apparatus for activating or deactivating a mode for dynamically indicating to a terminal a feedback timing of a hybrid automatic repeat and request (HARQ) acknowledgement (ACK) signal in a wireless communication system which adopts CA between a plurality of carriers.

In addition, the present disclosure provides a method and an apparatus for indicating a feedback timing of a HARQ ACK signal through downlink control information in a wireless communication system which adopts CA between a plurality of carriers.

In addition, the present disclosure provides a method and an apparatus of a terminal for interpreting a feedback timing value of a HARQ ACK signal transmitted through downlink control information in a wireless communication system which adopts CA between a plurality of carriers.

According to various embodiments of the present disclosure, an operating method of a terminal in a wireless communication system may include receiving information notifying an indication scheme relating to a carrier for transmission of uplink control information, and receiving subcarrier information for the transmission of the uplink control information according to the indication scheme, wherein the carrier for the transmission of the uplink control information may be one of uplink carriers used for carrier aggregation (CA) of the terminal.

According to various embodiments of the present disclosure, an operating method of a base station in a wireless communication system may include transmitting information notifying an indication scheme relating to a carrier for transmission of uplink control information of a terminal, and transmitting subcarrier information for the transmission of the uplink control information according to the indication scheme, wherein the carrier for the transmission of the uplink control information may be one of uplink carriers used for CA of the terminal.

According to various embodiments of the present disclosure, an apparatus of a terminal in a wireless communication system may include a transceiver and at least one processor connected with the transceiver, wherein the at least one processor may control to receive information notifying an indication scheme relating to a carrier for transmission of uplink control information, and receive subcarrier information for the transmission of the uplink control information according to the indication scheme, wherein the carrier for the transmission of the uplink control information may be one of uplink carriers used for CA of the terminal.

According to various embodiments of the present disclosure, an apparatus of a base station in a wireless communication system may include a transceiver and at least one processor connected with the transceiver, wherein the at least one processor may control to transmit information notifying an indication scheme relating to a carrier for transmission of uplink control information of a terminal, and transmit subcarrier information for the transmission of the uplink control information according to the indication scheme, wherein the carrier for the transmission of the uplink control information may be one of uplink carriers used for CA of the terminal.

According to various embodiments of the present disclosure, an operating method of a terminal in a wireless communication system may include reporting capability information of the terminal to a base station. Herein, the capability information may be whether CA is supported or the number of uplink carriers simultaneously transmittable. An operating method of the base station includes determining a mode for indicating a carrier for uplink control signal transmission to the terminal. Herein, the mode for indicating the carrier for the uplink control signal transmission to the terminal may be a static indication mode, or a semi-static indication, or a dynamic indication mode. In addition, the operating method of the base station may include indicating to the terminal the mode for indicating the carrier for the uplink control signal transmission to the terminal with the determined uplink carrier.

According to various embodiments of the present disclosure, an operating method of a terminal in a wireless communication system may include reporting channel information of the terminal to a base station. Herein, the channel information may be a value indicating a channel quality or a received signal to noise ratio. An operating method of the base station includes dynamically indicating a carrier for transmission of an uplink control signal over a downlink control signal transmission channel. In addition, to efficiently indicate this, it may include presetting some of carrier information for the transmission of the uplink control signal.

According to various embodiments of the present disclosure, an operating method of a base station includes generating hybrid automatic repeat and request (HARQ) acknowledgement (ACK) feedback timing information transmitted through a downlink control signal. In addition, an operating method of a terminal includes may include a method for interpreting the HARQ ACK feedback timing information transmitted by the base station.

An apparatus and a method according to various embodiments of the present disclosure may, if performing carrier aggregation (CA) on a plurality of uplink carriers in a wireless communication system, efficiently indicate to a terminal a carrier for transmission of an uplink control signal, and thus provide an effect for efficiently transmitting a hybrid automatic repeat and request (HARQ) acknowledgement (ACK) for a downlink signal. Further, the apparatus and the method according to various embodiments of the present disclosure may provide an effect of reducing a delay time compared to a conventional system, provide an effect of improving transmission reliability of the uplink control signal, and provide an effect of improving use efficiency of uplink resource.

Effects obtainable from the present disclosure are not limited to the above mentioned effects, and other effects which are not mentioned may be clearly understood by those skilled in the technical field to which the present disclosure belongs through the following descriptions.

DETAILED DESCRIPTION

The terms used in the present disclosure are only used to describe specific embodiments, and are not intended to limit other embodiments. Singular expressions may include plural expressions as well unless the context clearly indicates otherwise. All terms used herein including technical and scientific terms may have the same meaning as those commonly understood by a person skilled in the art to which the present disclosure pertains. Terms such as those defined in a generally used dictionary among the terms used in the present disclosure may be interpreted to have the meanings equal or similar to the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for transmitting an uplink control signal in a wireless communication system. Specifically, the present disclosure describes a method of a base station for efficiently selecting a carrier for uplink control information transmission and a technique for efficiently indicating the selected carrier to a corresponding terminal, if carrier aggregation (CA) is performed on a plurality of carriers in the wireless communication system.

Terms indicating signals, terms indicating control information, terms indicating network entities, and terms indicating components of an apparatus, which are used in the following descriptions, are for the sake of explanations. Accordingly, the present disclosure is not limited to the terms to be described, and may use other terms having technically identical meaning.

In addition, the present disclosure describes various embodiments using terms used in some communication standards (e.g., 3rd generation partnership (3GPP)), which is merely an example for explanations. Various embodiments of the present disclosure may be easily modified and applied in other communication systems.

Figure 1:
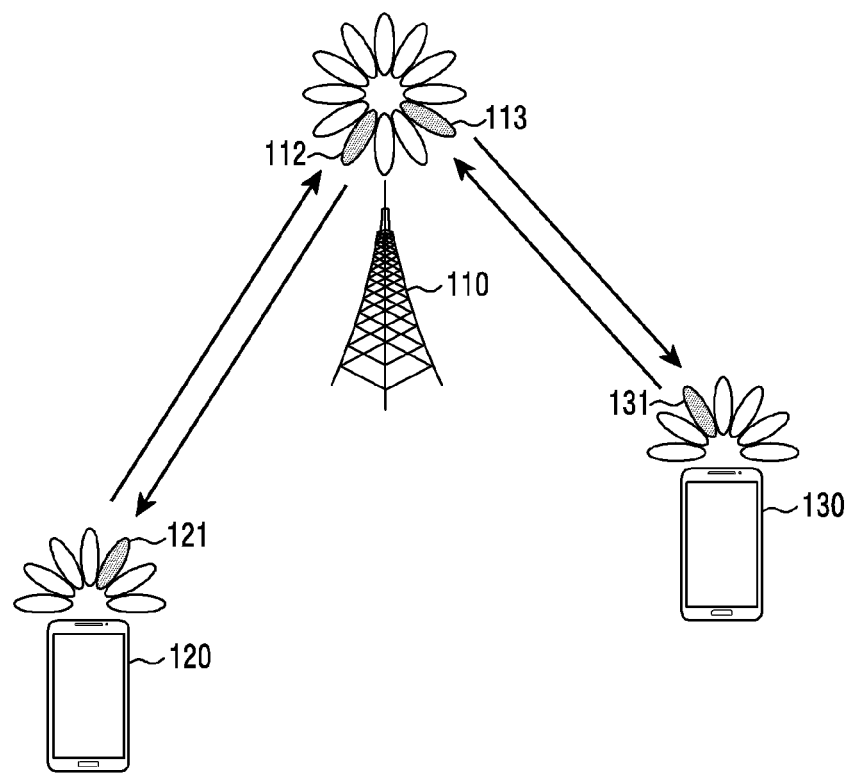
FIG. 1 illustrates a wireless communication system according to various embodiments of the present disclosure.

FIG. 1 illustrates a wireless communication system according to various embodiments of the present disclosure. FIG. 1 illustrates a base station 110, a terminal 120, and a terminal 130, as some of nodes which use a radio channel in the wireless communication system. While FIG. 1 depicts only one base station, other base station which is identical or similar to the base station 110 may be further included.

The base station 110 is a network infrastructure which provides radio access to the terminals 120 and 130. The base station 110 has coverage defined as a specific geographical area based on a signal transmission distance. The base station 110 may be referred to as, besides the base station, 'an access point (AP)', 'an eNodeB (eNB)', 'a 5th generation node (5G node)', 'a wireless point', 'a transmission/reception point (TRP)', or other terms having technically identical meaning.

The terminal 120 and the terminal 130 each are a device used by a user, and communicate with the base station 110 over a radio channel. In some cases, at least one of the terminal 120 and the terminal 130 may operate without user's involvement. That is, at least one of the terminal 120 and the terminal 130 performs is a device which performs machine type communication (MTC), and may not be carried by the user. The terminal 120 and the terminal 130 each may be referred to as, besides the terminal, 'a user equipment (UE)', 'a mobile station', 'a subscriber station', 'a remote terminal', 'a wireless terminal', 'a user device', or other term having a technically equivalent meaning.

The base station 110, the terminal 120, and the terminal 130 may transmit and receive radio signals in a millimeter wave (mmWave) band (e.g., 28 GHz, 30 GHz, 38 GHz, 60 GHz). In so doing, to improve channel gain, the base station 110, the terminal 120, and the terminal 130 may conduct beamforming. Herein, the beamforming may include transmit beamforming and receive beamforming. That is, the base station 110, the terminal 120, and the terminal 130 may apply directivity to a transmit signal or a received signal. For doing so, the base station 110 and the terminals 120 and 130 may select serving beams 112, 113, 121, and 131 through a beam search or beam management procedure. After the serving beams 112, 113, 121, and 131 are selected, communications may be performed using resources which are quasi co-located (QCL) with resources which transmit the serving beams 112, 113, 121, and 131.

A conventional mobile communication system (e.g., a long term evolution (LTE) system) pre-defines a timing of a terminal for transmitting a hybrid automatic repeat and request (HARQ) acknowledgement (ACK) signal to a base station after receiving a signal, and accordingly the terminal feeds back a HARQ ACK signal. Hence, a downlink control signal (e.g., a downlink control information (DCI)) may exclude timing information at which the terminal is to feed back the HARQ ACK signal.

In the system according to various embodiments, a processing time for a received signal may vary in each terminal, and the subcarrier spacing may vary in each frequency band. In addition, one of time division duplex (TDD) or frequency division duplex (FDD) may be applied in each frequency band. To apply a more flexible operation than the conventional system in an environment having such diversity, a method for including HARQ ACK timing information in a downlink control signal may be adopted. In this case, the timing information of the HARQ ACK signal indicated by the downlink control signal may be interpreted based on the subcarrier spacing of an uplink control channel.

Meanwhile, the system according to various embodiments may support the CA technique using a plurality of carriers. At this time, the subcarrier spacing and the duplex scheme for each carrier may differ. For example, there may be one downlink carrier, and the CA may be performed on two uplink carriers. In this case, different subcarrier spacings may be applied in two uplink carriers. For example, one uplink carrier may apply a 15 kHz subcarrier spacing, and the other uplink carrier may apply a 60 kHz subcarrier spacing. In addition, each uplink carrier may adopt a different duplex scheme. For example, the carrier applying the 15 kHz subcarrier may adopt the FDD, and the carrier applying the 60 kHz subcarrier may adopt the TDD.

In this case, the base station needs to indicate a carrier for transmitting the uplink control signal to the terminal. Herein, the carrier for transmitting the uplink control signal may be referred to as 'a carrier to be used for the uplink control signal transmission', 'a carrier for delivering the uplink control signal', 'a carrier for the transmission of the uplink control signal', 'a carrier for the uplink control signal transmission', or other term having technically identical meaning. In the conventional system, such indication has been conducted statically static or semi-statically. However, in the system according to various embodiments, since there may be various combinations of the CA configuration and the transmission method as described above, the dynamic indication may be also considered.

In addition, the base station needs to indicate a timing for the terminal to feed back a HARQ ACK signal through a downlink control signal. The HARQ ACK timing information included in the downlink control signal may be interpreted based on the uplink subcarrier spacing which transmits the uplink control signal. If the base station dynamically indicates the carrier for the transmission of the uplink control signal, a new method for transmitting the HARQ ACK timing information or a new rule for interpreting the transmitted HARQ ACK timing information may be required by reflecting it.

A plurality of terminals may be present in one cell, and there may be a terminal for supporting the CA technique for a plurality of carriers among them. For example, a particular terminal may support the FDD in a low frequency band, and may support the TDD in a high frequency band. Also, a corresponding terminal may perform simultaneous transmission using a plurality of carriers. In addition, a corresponding terminal may select and transmit one of the carriers. In addition, a corresponding terminal may select one of the carriers, and transmit a signal by dynamically switching the carriers.

According to one embodiment, a particular base station and the terminal may apply the uplink CA technique for the carrier of the low frequency band and the carrier of the high frequency band. For example, the low frequency band may be an uplink frequency band of a band used by the conventional system, and the high frequency band may be a band (e.g., 3 through 6 GHz) allocated for the system according to various embodiments. As another example, the low frequency band may be a band (e.g., 3 through 6 GHz) allocated for the system according to various embodiments, and the high frequency band may be an mmWave frequency band above 10 GHz.

In such a case, the base station needs to determine the carrier for the transmission of the uplink control signal of the terminal, and indicate to the terminal. Herein, the indication to the terminal may follow a static or semi-static or dynamic scheme.

As mentioned above, a plurality of terminals may exist in the cell of the 5G system, among which a terminal for supporting the CA technique for a plurality of carriers may exist. Also, with respect to these terminals, the base station may apply the CA technique to the carrier of the low frequency band and the carrier of the high frequency band. By applying the CA technique, the base station may transmit a downlink signal to the terminal through a plurality of the carriers, and the terminal may receive the signal transmitted from the base station through a plurality of the carriers. The terminal may demodulate and decode the received signal, and then feed a HARQ ACK signal back to the base station.

In addition, the terminal may transmit an uplink signal (e.g., data and control signals) to the base station. At this time, the terminal may apply the CA technique for a plurality of carriers. However, since the uplink control signal generally includes a packet of a small size, the terminal may selectively use one of the carriers. For doing so, the base station needs to determine the carrier to use for the terminal to transmit the uplink control signal, and indicate it to the terminal.

If the terminal is able to apply the CA technique for the carrier of the low frequency band and the carrier of the high frequency band, based on conditions of the terminal, the carrier suitable for transmitting the uplink control signal may differ.

There may be a terminal for which it is more advantageous to use the carrier of the low frequency band than the carrier of the high frequency band for the uplink control signal transmission. For example, if the carrier of the high frequency band of the mmWave band is used for the uplink control signal transmission, in case of terminals located outside the cell, uplink control signal transmission reliability may be low due to considerable path loss of the high frequency band. In this case, if the terminal uses the carrier of the low frequency band in the uplink control signal transmission, the transmission reliability of the uplink control signal may be greatly improved. As another example, if the carrier of the high frequency band adopts the TDD for the transmission of the uplink control signal, the uplink control signal transmission may be subject to a considerable delay according to an uplink/downlink configuration of the TDD system. In this case, if the terminal uses the carrier of the low frequency band adopting the FDD in the uplink control signal transmission, a delay time occurring in the transmission of the uplink control signal may greatly reduce.

Meanwhile, there may be a terminal for which it is more advantageous to use the carrier of the high frequency band than the carrier of the low frequency band for the uplink control signal transmission. For example, the carrier of the low frequency band may use a narrower frequency band than the carrier of the high frequency band, and thus a subcarrier spacing of the low frequency band may be smaller than a subcarrier spacing of the high frequency band. If the subcarrier spacing reduces, a transmission duration of an orthogonal frequency division multiplexing (OFDM) symbol may increase and a scheduling interval may increase. Accordingly, the uplink control signal transmission using the carrier of the low frequency band may be disadvantageous in terms of the delay time according to a reception time of the downlink signal received at the terminal. In addition, since it is highly likely that the frequency band allocated to the carrier of the low frequency band is small, if a plurality of terminals transmits an uplink control signal using the carrier of the low frequency band, delay may occur because traffic is excessively concentrated, and a problem of performance degradation may occur.

If the CA is performed on the plurality of the carriers as stated above, the carrier advantageous to transmit the uplink control signal may differ according to the conditions of the terminal. Herein, the carrier advantageous to transmit the uplink control signal may differ according to the location and a channel state of the terminal, may differ according to the time at which the terminal receives a downlink signal, may differ according to the duplex scheme of the carrier on which the CA is performed, may differ according to the subcarrier spacing of the carrier on which the CA is performed, and may differ according to requirements of a service supported by the terminal.

For this reason, the base station may need to dynamically determine the carrier for the transmission of the uplink control signal according to the conditions of the terminal, and to dynamically indicate it to the terminal. In addition, the base station needs to semi-statically determine the carrier for the transmission of the uplink control signal according to the conditions of the terminal, and to semi-statically indicate it to the terminal. Further, the base station needs to statically determine the carrier for the transmission of the uplink control signal according to the conditions of the terminal, and to statically indicate it to the terminal.

According to various embodiments, for the terminal to indicate the carrier for the transmission of the downlink control signal, one of a plurality of indication modes is used. For example, the plurality of the indication modes may include a static indication mode, a semi-static indication, and a dynamic indication mode.

The static indication mode may indicate a scheme which indicates the carrier for the transmission of the uplink control signal in an initial access procedure between the base station and the terminal. Herein, the initial access procedure may be an initial random access process. In addition, the static indication mode may mean that the carrier for the transmission of the uplink control signal determined by the base station and the terminal in the initial access procedure is not changed outside the initial access procedure.

The semi-static indication mode may indicate a scheme in which the base station periodically or aperiodically indicates to the terminal the carrier for transmitting the uplink control signal. That is, according to the semi-static indication mode, information indicating the carrier for transmitting the uplink control signal may be delivered to the terminal periodically or aperiodically. For example, the information indicating the carrier for transmitting the uplink control signal may be transmitted periodically or aperiodically through a radio resource control (RRC) message, or a medium access control (MAC) control element (CE).

The dynamic indication mode may mean a scheme in which the base station indicates to the terminal the carrier for the terminal to transmit the uplink control signal through DCI. That is, according to the dynamic indication mode, information indicating the carrier for transmitting the uplink control signal is transmitted through the downlink control information, and the downlink control information may include resource allocation information related to downlink data to a corresponding terminal. Hence, the dynamic indication mode supports changing the carrier for transmitting the uplink control signal on a transmit time interval (TTI) basis. Thus, the terminal transmits an ACK/negative ACK (NACK) related to the downlink data received through the resource indicated by the downlink control information through the uplink carrier indicated by the same downlink control information.

The above-described three indication modes are illustrated according to various embodiments, and other indication mode may be used additionally or alternatively to any one of them. The other indication mode may be a combination of two or more of the above-mentioned indication modes, or may be defined in other manner.

Figure 2:
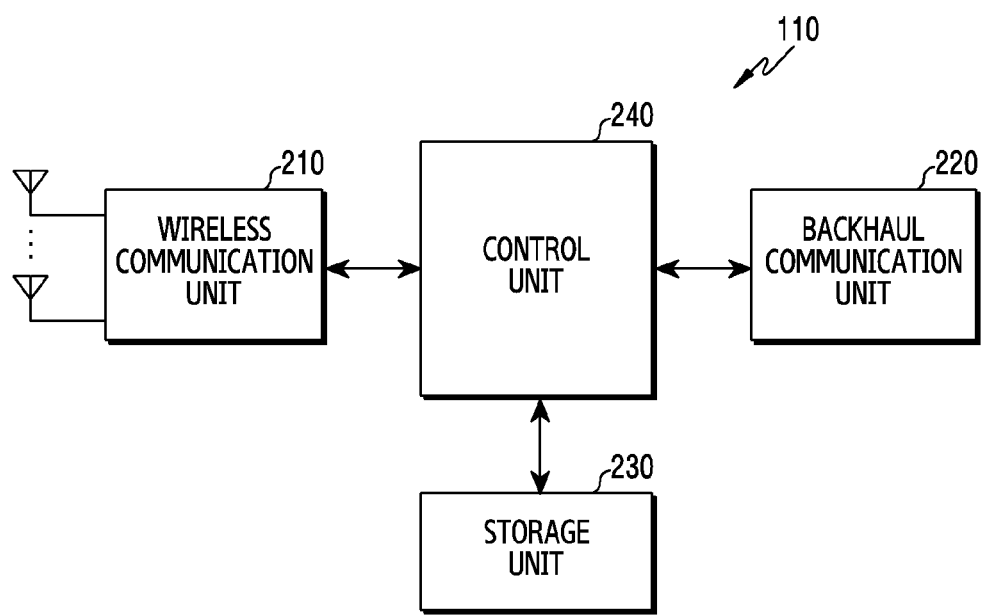
FIG. 2 illustrates a configuration of a base station in a wireless communication system according to various embodiments of the present disclosure.

FIG. 2 illustrates a configuration of a base station in a wireless communication system according to various embodiments of the present disclosure. The configuration in FIG. 2 may be understood as the configuration of the base station 110. A term such as 'portion' or '~er' used hereafter indicates a unit for processing at least one function or operation, and may be implemented using hardware, software, or a combination of hardware and software.

Referring to FIG. 2, the base station 110 includes a wireless communication unit 210, a backhaul communication unit 220, a storage unit 230, and a control unit 240.

The wireless communication unit 210 performs functions for transmitting and receiving signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal. Also, the wireless communication unit 210 up-converts the baseband signal to a radio frequency (RF) band signal, transmits it via an antenna, and down-converts an RF band signal received via an antenna to a baseband signal.

For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements. In terms of the hardware, the wireless communication unit 210 may include a digital unit and an analog unit, and the analog unit may include a plurality of sub-units according to an operating power and an operating frequency.

The wireless communication unit 210 transmits and receives the signals as stated above. Hence, whole or part of the wireless communication unit 210 may be referred to as 'a transmitter', 'a receiver', or 'a transceiver'. Also, in the following explanation, the transmission and the reception over the radio channel is used as the meaning which embraces the above-stated processing of the wireless communication unit 210.

The backhaul communication unit 220 provides an interface for communicating with other nodes in the network. That is, the backhaul communication unit 220 converts a bit sting transmitted from the base station to another node, for example, to another access node, another base station, an upper node, or a core network, to a physical signal, and converts a physical signal received from the other node to a bit string.

The storage unit 230 stores a basic program for operating the base station, an application program, and data such as setting information. The storage unit 230 may include a volatile memory, a non-volatile memory, or a combination of a volatile memory and a non-volatile memory. The storage unit 230 provides the stored data at a request of the control unit 240.

The control unit 240 controls general operations of the base station. For example, the control unit 240 transmits and receives signals through the wireless communication unit 210 or the backhaul communication unit 220. Also, the control unit 240 records and reads data in and from the storage unit 230. The control unit 240 may execute functions of a protocol stack requested by a communication standard. For doing so, the control unit 240 may include at least one processor.

According to various embodiments, the control unit 240 may control other components to transmit information notifying an indication scheme relating to a carrier for transmission of uplink control information, and to transmit information of the carrier for the transmission of the uplink control information according to the indication scheme. For example, the control unit 240 may control the base station to perform operations according to various embodiments to be described.

Figure 3:
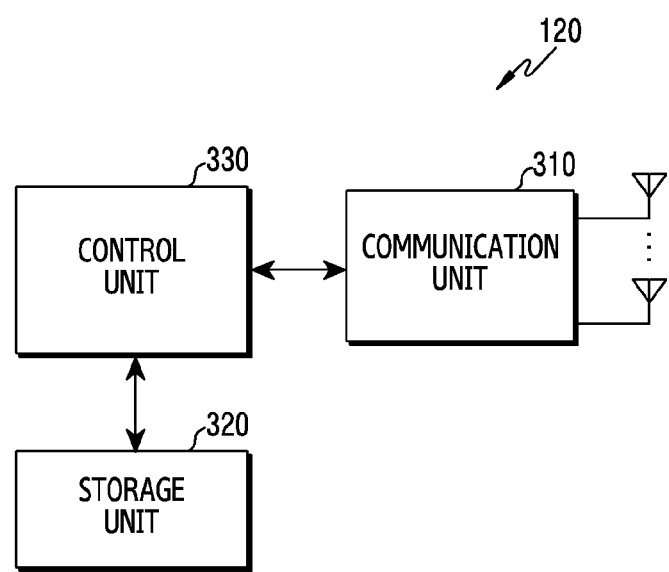
FIG. 3 illustrates a configuration of a terminal in a wireless communication system according to various embodiments of the present disclosure.

FIG. 3 illustrates a configuration of a terminal in a wireless communication system according to various embodiments of the present disclosure. The configuration illustrated in FIG. 3 may be understood as the configuration of the terminal 120. A term such as 'portion' or '~er' used hereafter indicates a unit for processing at least one function or operation, and may be implemented using hardware, software, or a combination of hardware and software.

Referring to FIG. 3, the terminal 120 includes a communication unit 310, a storage unit 320, and a control unit 330.

The communication unit 310 may perform functions for transmitting and receiving signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal and then transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In view of the hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

The communication unit 310 transmits and receives the signals as stated above. Hence, whole or part of the communication unit 310 may be referred to as 'a transmitter', 'a receiver', or 'a transceiver'. In addition, the transmission and the reception over the radio channel are used as the meaning which embraces the above-stated processing of the communication unit 310 in the following explanations.

The storage unit 320 stores a basic program for operating the terminal, an application program, and data such as setting information. The storage unit 320 may include a volatile memory, a non-volatile memory, or a combination of a volatile memory and a non-volatile memory. The storage unit 320 provides the stored data according to a request of the control unit 330.

The control unit 330 controls general operations of the terminal. For example, the control unit 330 transmits and receives signals through the communication unit 310. Also, the control unit 330 records and reads data in and from the storage unit 320. The control unit 330 may execute functions of a protocol stack required by a communication standard. For doing so, the control unit 330 may include at least one processor or microprocessor, or may be part of a processor. In addition, part of the communication unit 310 and the control unit 330 may be referred to as a communication processor (CP).

According to various embodiments, the control unit 330 may control other components to receive information notifying an indication scheme relating to a carrier for transmission of uplink control information, and to receive information of the carrier for the transmission of the uplink control information according to the indication scheme. For example, the control unit 330 may control the terminal to perform operations according to various embodiments to be described.

Figure 4:
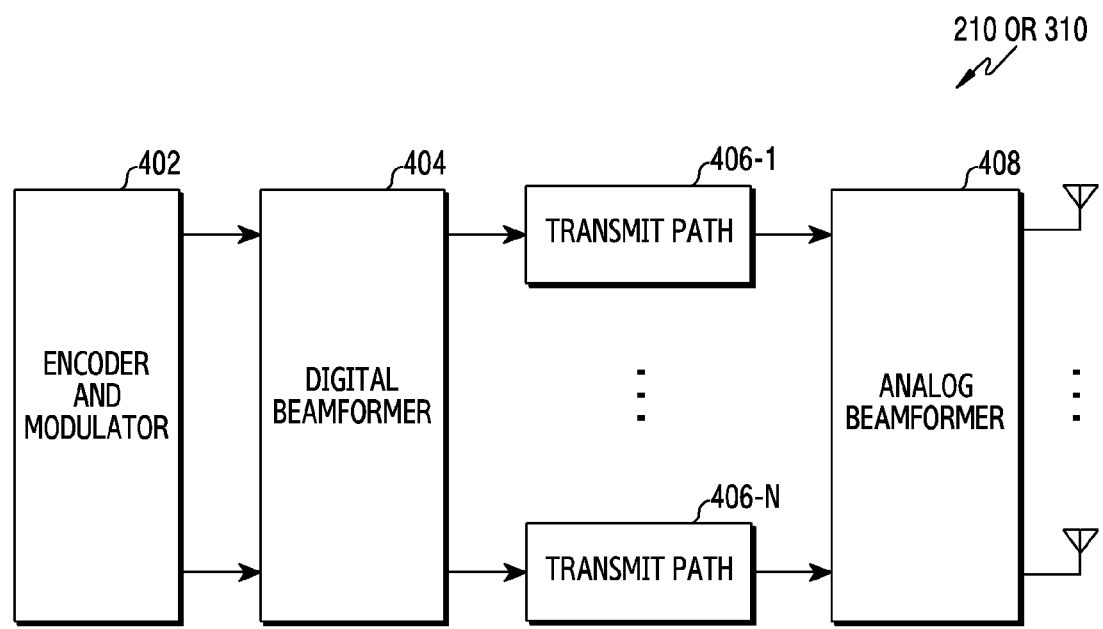
FIG. 4 illustrates a configuration of a communication unit in a wireless communication system according to various embodiments of the present disclosure.

FIG. 4 illustrates a configuration of a communication unit in a wireless communication system according to various embodiments of the present disclosure. FIG. 4 depicts a detailed configuration of the wireless communication unit 210 of FIG. 2 or the communication unit 210 of FIG. 3. Specifically, FIG. 4 depicts components for performing the beamforming, as part of the wireless communication unit 210 of FIG. 2 or the communication unit 310 of FIG. 3.

Referring to FIG. 4, the wireless communication unit 210 or the communication unit 310 includes an encoder and modulator 402, a digital beamformer 404, a plurality of transmit paths 406-1 through 406-N, and an analog beamformer 408.

The encoder and modulator 402 performs channel encoding. For the channel encoding, at least one of low density parity check (LDPC) code, convolution code, and polar code may be used. The encoder and modulator 402 generates modulation symbols through constellation mapping.

The digital beamformer 404 beamforms a digital signal (e.g., the modulation symbols). For doing so, the digital beamformer 404 multiplies the modulation symbols by beamforming weights. Herein, the beamforming weights are used to change a level and a phase of a signal, and may be referred to as 'a precoding matrix' or 'a precoder'. The digital beamformer 404 outputs the digital-beamformed modulation symbols to the plurality of transmit paths 406-1 through 406-N. In so doing, according to a multiple input multiple output (MIMO) transmission scheme, the modulation symbols may be multiplexed, or the same modulation symbols may be provided to the plurality of transmit paths 406-1 through 406-N.

The plurality of the transmit paths 406-1 through 406-N converts the digital-beamformed digital signals to analog signals. For doing, the plurality of the transmit paths 406-1 through 406-N each may include an inverse fast fourier transform (IFFT) operator, a CP adder, a DAC, and an up-converter. The CP adder is used for the OFDM scheme, and may be excluded if other physical layer scheme (e.g., filter bank multi-carrier (FBMC)) is applied. That is, the plurality of transmit paths 406-1 through 406-N provides an independent signal process for a plurality of streams generated through the digital beamforming. Notably, depending on the implementation, some of the components of the transmit paths 406-1 through 406-N may be used in common.

The analog beamformer 408 beamforms the analog signals. For doing so, the digital beamformer 404 multiplies the analog signals by the beamforming weights. Herein, the beamforming weights are used to change the level and the phase of the signal.

Figure 5:
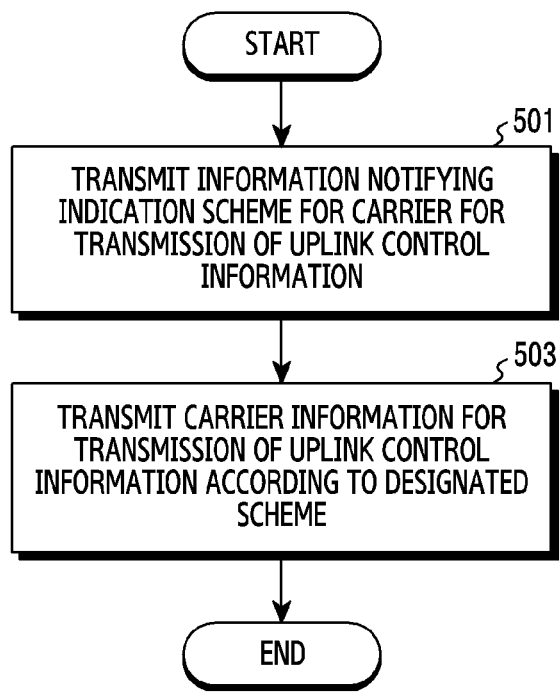
FIG. 5 illustrates a flowchart of a base station in a wireless communication system according to various embodiments of the present disclosure.

FIG. 5 depicts a flowchart of a base station in a wireless communication system according to various embodiments of the present disclosure. FIG. 5 illustrates an operating method of the base station 110.

Referring to FIG. 5, in step 501, the base station transmits information notifying an indication scheme for a carrier for transmission of uplink control information. For doing so, the base station may receive capability related information of the terminal from the terminal, and determine the indication scheme based on the capability related information. For example, the indication scheme may be determined to one of the static indication mode, the semi-indication mode, and the dynamic indication mode.

In step 503, the base station transmits information of the carrier for the transmission of the uplink control information according to a designated scheme. That is, the base station may determine the carrier for the transmission of the uplink control information of the terminal, and transmit control information notifying the determined carrier. At this time, the control information may be transmitted by a scheme corresponding to the determined indication scheme. For example, the base station may transmit the information indicating the carrier for the transmission of the uplink control information through at least one of an RRC message, MAC CE, and DCI. According to one embodiment, the information indicating the carrier for the transmission of the uplink control information may be configured in stages. For example, first information relating to a first carrier mainly used and a second carrier for assisting it, and second information indicating to use one of the first carrier and the second carrier are defined, and the first information and the second information may be transmitted in different manners.

Although not depicted in FIG. 5, according to another embodiment, the base station may further transmit additional information. For example, the base station may further transmit information (e.g., first information indicating a feedback timing and a second value indicating a size of the first information) related to a feedback timing of a HARQ ACK for downlink data.

Figure 6:
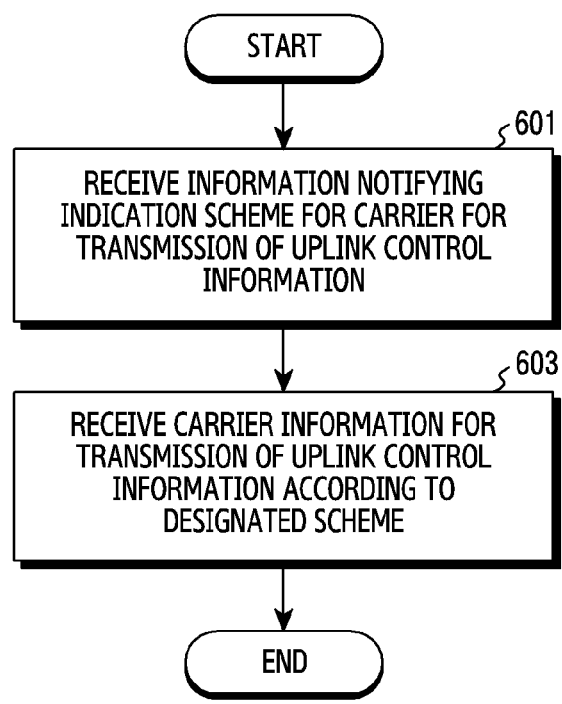
FIG. 6 illustrates a flowchart of a terminal in a wireless communication system according to various embodiments of the present disclosure.

FIG. 6 illustrates a flowchart of a base station in a wireless communication system according to various embodiments of the present disclosure. FIG. 6 illustrates an operating method of the terminal 120.

Referring to FIG. 6, in step 601, the terminal receives information notifying an indication scheme for a carrier for transmission of uplink control information. For example, the indication scheme may be determined to one of the static mode, the semi-static mode, and the dynamic mode. Before doing so, the terminal may transmit capability related information of the terminal to the base station. The capability related information may be used by the base station to determine the indication scheme.

In step 603, the terminal receives information of the carrier for the transmission of the uplink control information according to a designated scheme. That is, the terminal may transmit control information notifying the carrier for the transmission of the uplink control information. At this time, the control information may be received by a scheme corresponding to the determined indication scheme. For example, the terminal may receive the information indicating the carrier for the transmission of the uplink control information through at least one of an RRC message, MAC CE, and DCI. According to one embodiment, the information indicating the carrier for the transmission of the uplink control information may be configured in stages. For example, first information relating to a first carrier mainly used and a second carrier for assisting it, and second information indicating to use one of the first carrier and the second carrier are defined, and the first information and the second information may be received in different manners.

Although not depicted in FIG. 6, according to another embodiment, the terminal may further receive additional information. For example, the terminal may further transmit information (e.g., first information indicating a feedback timing and a second value indicating a size of the first information) related to a feedback timing of a HARQ ACK for downlink data.

According to the embodiment described with reference to FIG. 5 and FIG. 6, the carrier for the transmission of the uplink control information may be indicated by the scheme appropriate for the environment (e.g., capability) of the terminal. Hereafter, more specific operations of the above-mentioned embodiment are described with reference to the drawings.

Figure 7:
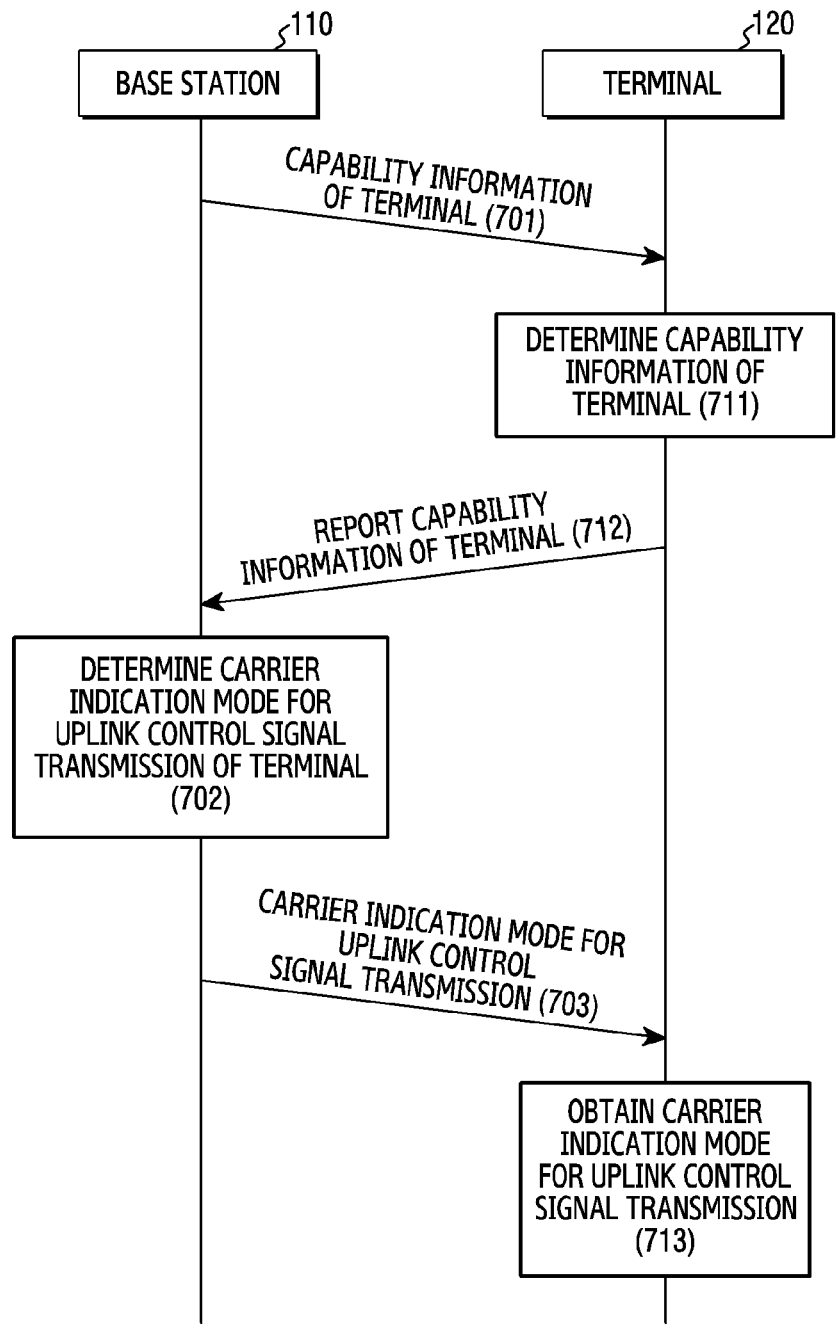
FIG. 7 illustrates signal exchange for determining a scheme for indicating a carrier for transmission of uplink control information in a wireless communication system according to various embodiments of the present disclosure.

FIG. 7 illustrates signal exchange for determining a scheme for indicating a carrier for transmitting uplink control information in a wireless communication system according to various embodiments of the present disclosure. FIG. 7 illustrates signaling between the base station 110 and the terminal 120.

Referring to FIG. 7, in step 701, the base station 110 may request capability information report of the terminal 120 from the terminal 120. The request of step 701 may be performed at an initial access procedure of the terminal 120, or may be performed in a connected state (e.g., RRC connected state) regardless of the initial access procedure. Herein, the capability information of the terminal 120 may include at least one of whether uplink CA is supported, supportable carrier information, supportable subcarrier spacing of each carrier, a duplex scheme applicable to each carrier, and simultaneous transmission capability for a plurality of carriers in CA application. Accordingly, in step 712, the base station 110 receives the terminal capacity information from the terminal 120. According to another embodiment, the capability information of the terminal 120 may be received without the request of step 701.

In step 702, the base station 110 may determine a mode indicating a carrier to be used by the terminal 120 for transmission of an uplink control signal based on the capability information reported by the terminal 120. Herein, the mode indicating the carrier to be used by the terminal 120 for the uplink control signal transmission may be one of the static indication mode, the semi-static indication mode, and the dynamic indication mode.

For example, if the terminal 120 has reported the capability information notifying that the CA is applicable for a plurality of carriers and uplink simultaneous transmission is possible for a plurality of carriers, the base station 110 may determine to apply the mode dynamically indicating the carrier for transmitting the uplink control signal to the terminal 120. For example, if the terminal 120 has reported the capability information notifying that the CA is applicable to a plurality of carriers, the uplink simultaneous transmission is impossible for the plurality of the carriers, and a transition time for switching the uplink carrier is required, the base station 110 may determine to apply the mode semi-statically indicating the carrier for transmitting the uplink control signal to the corresponding terminal 120. For example, if the terminal 120 has reported the capability information notifying that it is impossible to apply the CA to the plurality of the carriers, the base station 110 may determine to apply the mode statically indicating the carrier for transmitting the uplink control signal to the corresponding terminal 120.

In step 703, the base station 110 may indicate to each terminal 120 the carrier indication mode for the uplink control signal transmission of the terminal 120 as determined above. Herein, to indicate to the terminal 120 the carrier indication mode for the uplink control signal transmission of the terminal 120, the base station 110 may transmit information indicating the indication mode using an RRC message or a MAC CE signal.

Operations of the terminal 120 for the operations of the base station 110 as above are as follows. The terminal 120 receiving a request of the base station 110 may determine its capability information, in step 711. Next, in step 712, the terminal 120 may transmit the determined capability information to the base station 110. Herein, the capability information of each terminal 120 may include at least one of whether the uplink CA is supported, the supportable carrier information, the supportable subcarrier spacing of each carrier, the duplex scheme applicable to each carrier, and the simultaneous transmission capability for a plurality of carriers in CA application. In step 703, the terminal 120 receives the information of the carrier indication mode for the uplink control signal transmission from the base station 110.

In step 713, the terminal 120 may obtain the carrier indication mode for the uplink control signal transmission. The terminal 120 may detect the RRC signal and obtain the carrier indication mode for the uplink control signal transmission of the terminal 120 in the RRC message. For example, the terminal 120 may detect the MAC CE, and obtain the carrier indication mode for the uplink control signal transmission of the terminal 120 in the corresponding message. Herein, the mode indicating the carrier to use for the uplink control signals transmission obtained at the terminal 120 may be one of the static indication mode, the semi-static indication mode, and the dynamic indication mode.

Next, although not depicted in FIG. 7, the terminal 120 may identify the carrier for the transmission of the uplink control signal according to the mode indicating the carrier for the transmission of the uplink control signal, and transmit an uplink control signal. The transmitting operation of the uplink control signal in each mode is as follows.

If the mode indicating the carrier to use for the uplink control signal transmission is the static indication mode, the terminal 120 may transmit the uplink control signal according to the information relating to the carrier for the transmission of the uplink control signal obtained at the initial access procedure. Also, the terminal 120 recognizes that the carrier information for the transmission of the uplink control signal is not transmitted through the RRC message or the MAC CE, and detects an RRC message or a MAC CE signal. In addition, the terminal 120 may recognize that the carrier information for the transmission of the uplink control signal is not transmitted through DCI, and accordingly consider DCI formats not including the carrier information for the transmission of the uplink control signal as candidate DCI formats for blind detection of the DCI.

If the mode indicating the carrier to use for the uplink control signal transmission is the semi-static indication mode, the terminal 120 may obtain the information relating to the carrier for the transmission of the uplink control signal through the RRC message or the MAC CE. Also, the terminal 120 may recognize that the carrier information for the transmission of the uplink control signal is not transmitted through DCI, and thus consider DCI formats not including the carrier information for the transmission of the uplink control signal as candidate DCI formats for the blind detection of the DCI.

If the mode indicating the carrier to use for the uplink control signal transmission is the dynamic indication mode, the terminal 120 recognizes that the carrier information for the transmission of the uplink control signal is not transmitted through the RRC message or the MAC CE, and detects an RRC message or a MAC CE signal. In addition, the terminal 120 may recognize that the carrier information for the transmission of the uplink control signal is transmitted through DCI, and thus attempt to decode a DCI format including the carrier information for the transmission of the uplink control signal in the blind detection process of the DCI. The terminal 120 may detect its DCI, and obtain the carrier information for the transmission of the uplink control signal from the detected DCI.

As stated above, if the mode indicating the carrier for the transmission of the uplink control signal of the terminal is determined, the terminal may identify the carrier for the transmission of the uplink control signal according to the determined mode, and transmit the uplink control signal. For example, if the dynamic mode is selected, the terminal may identify the carrier for the transmission of the uplink control signal from the DCI. Operations of the base station and the terminal in the dynamic mode are described in further detail by referring to FIG. 8.

Figure 8:
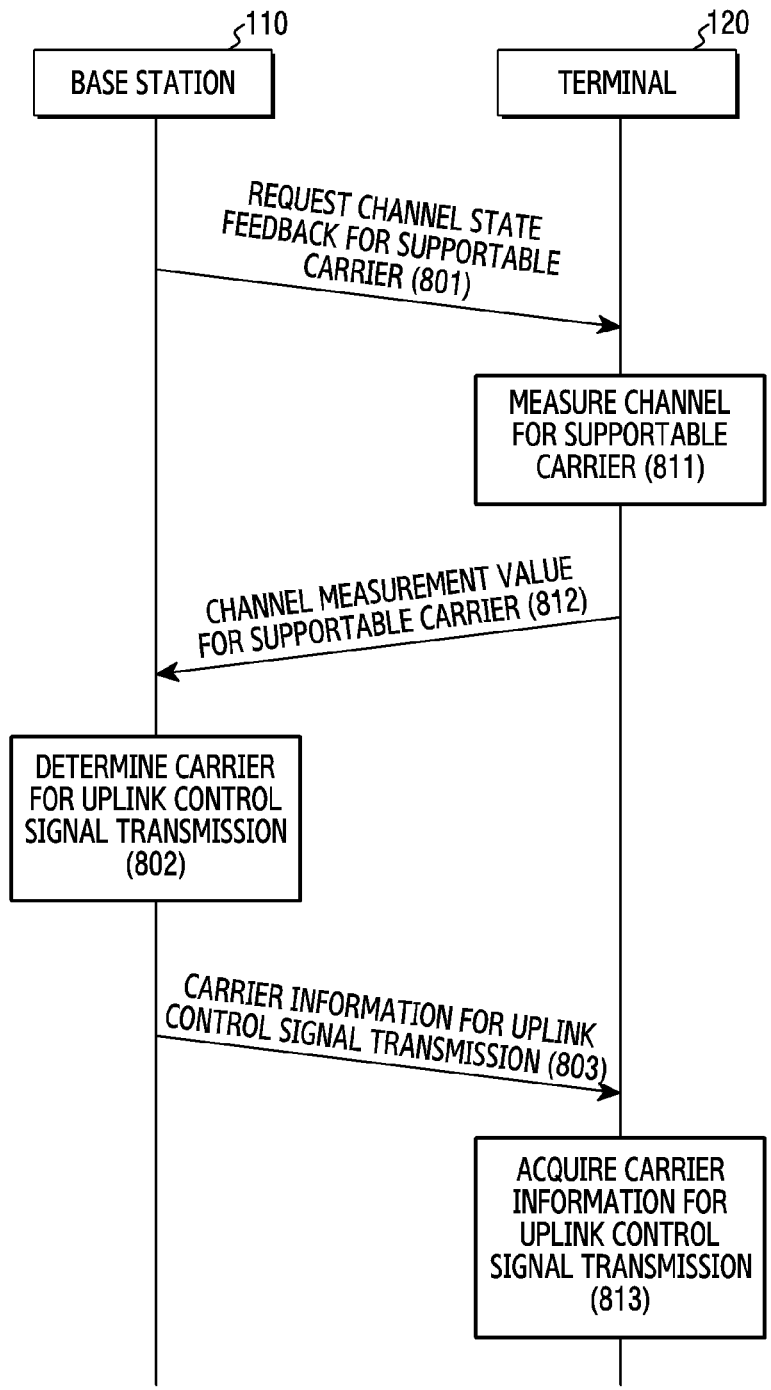
FIG. 8 illustrates signal exchange for indicating a carrier for transmitting uplink control information according to a dynamic mode in a wireless communication system according to various embodiments of the present disclosure.

FIG. 8 illustrates signal exchange for indicating a carrier for transmitting uplink control information according to a dynamic mode in a wireless communication system according to various embodiments of the present disclosure. FIG. 8 may be applied to a situation where the base station determines a carrier indication mode to use for uplink control signal transmission of a corresponding terminal to a dynamic indication mode, and transmits it to the terminal, wherein the terminal recognizes this.

Referring to FIG. 8, in step 801, the base station 110 may request channel state feedback for the supportable carrier from the terminal 120. Herein, the channel state may include at least one of a channel quality indicator (CQI), a reference signal received power (RSRP), a reference signal received quality (RSRQ), and a signal to interference and noise power ratio (SINR). In step 812, the base station 110 receives channel state information from the terminal 120. That is, the base station 110 receives channel measurement value(s) for the supportable carrier of the terminal 120.

In step 802, the base station 110 may determine a carrier for transmitting an uplink control signal of the terminal 120. At this time, the base station 110 may determine the carrier for transmitting the uplink control signal based on the channel state information received from the terminal 120, service requirements of the corresponding terminal 120, and so on. For example, the base station 110 may identify the CQI per carrier fed back by the terminal 120 and determine to transmit the uplink control signal with the carrier of the greatest value. As another example, the base station 110 may identify a channel quality (e.g., received SINR) per carrier fed back by the terminal 120 and determine to change the carrier for transmitting the uplink control signal if a currently set channel quality of the carrier for the uplink control channel is smaller than a reference value. The base station 110 may identify the channel quality for other carriers, and determine to transmit the uplink control signal with the carrier having the greatest value. As yet another example, the base station 110 may identify a service category of the signal transmitted to the corresponding terminal 120, and if the corresponding service is a service requiring low latency, determine to transmit the uplink control signal with the carrier which may minimize transmission delay of the uplink control signal by considering a duplex scheme per carrier and downlink/uplink configuration, the subcarrier spacing per carrier, and so on. As still another example, the base station 110 may identify the service category of the signal transmitted to the corresponding terminal 120, and if the corresponding service is a service requiring ultra high reliability, determine to transmit the uplink control signal with the carrier of the highest reliability by comparing the channel state per carrier.

In step 803, the base station 110 may transmit carrier information for transmitting the uplink control signal using the DCI. If there is a plurality of uplink carriers, the base station 110 may define a bit field over 1 bit, and include the carrier information for the transmission of the uplink control signal in the bit field. For example, if there are four uplink carriers (e.g., UL #1, UL #2, UL #3, UL #4), the carrier for the uplink control signal transmission may be indicated using 2-bit information as shown in the following <Table 1>.

TABLE 1

| Bit | Indication |
| --- | --- |
| 00 | UL #1 |
| 01 | UL #2 |
| 10 | UL #3 |
| 11 | UL #4 |

The operations of the terminal 110 are as follows by referring to FIG. 8. In step 811, the terminal 120 measures a channel for a supportable carrier at the request of the base station 110. Next, in step 812, the terminal 120 may transmit a measurement result of the channel for the supportable carrier to the base station 110. Herein, the channel state may include at least one of CQI, RSRP, RSRQ, and SINR. In step 803, the terminal 120 receives the carrier information carrier for transmitting the uplink control signal using the DCI from the base station 110.

In step 813, the terminal 120 may detect the DCI, and obtain (213) the carrier information for the transmission of the uplink control signal included in the DCI. For example, there may be a plurality of uplink carriers supportable by the terminal 120, the base station 110 may define the bit field of 1 bit or more to represent the indication for a particular uplink carrier, and a scheme for including the carrier information for the transmission of the uplink control signal in the bit field may be predefined. For example, if there are four uplink carriers (e.g., UL #1, UL #2, UL #3, UL #4), the carrier information for the transmission of the uplink control signal may be represented using two bits in the DCI as shown in the above <Table 1>. In this case, the terminal 120 may obtain the carrier information for the transmission of the uplink control signal from the bit field which is prearranged.

In the embodiment described with reference to FIG. 8, the base station 110 indicates one of the supportable carriers of the terminal 120 through the DCI. In this case, the carrier for the transmission of the uplink control information may be indicated through single signaling. According to another embodiment, the carrier for the transmission of the uplink control information may be indicated through stepwise signaling. In the following, an embodiment in which the carrier for the transmission of the uplink control information is indicated through the stepwise signaling is explained.

According to another embodiment, the base station 110 may indicate the carrier for the transmission of the uplink control signal to be mainly used by the corresponding terminal 120 through an RRC message or a MAC CE signal, and merely indicate whether to change it or not through the DCI. In other words, also, the scheme in which the base station 110 indicates the carrier for the transmission of the uplink control signal to be mainly used by the corresponding terminal 120 through the RRC or the MAC CE signal, and merely indicates whether to change it or not through the DCI may be prearranged between the base station 110 and the terminal 120.

For example, if the terminal 120 may support two uplink carriers, the base station 110 may designate one uplink carrier as a carrier (hereinafter, referred to as 'a reference carrier' or 'a main carrier' or 'default carrier') to be mainly used by the terminal 120 to transmit the uplink control signal, designate the other uplink carrier as a carrier (hereinafter, referred to as 'an assistant carrier' or 'an auxiliary carrier') to be relatively occasionally used to transmit the uplink control signal, and then inform the terminal 120 of whether to change it through the RRC or the MAC CE. If the base station 110 is to change the carrier for the transmission of the uplink control signal, it may indicate to the terminal 120 using only one bit as shown in <Table 2>. Hence, the terminal 120 may obtain carrier information for the transmission of the uplink control signal from the bit field which is prearranged.

TABLE 2

| Bit | Indication |
|---|---|
| 0 | Apply reference carrier to a carrier for transmitting uplink control signal |
| 1 | Apply assistant carrier to a carrier for transmitting uplink control signal |

By using the carrier information for the uplink control signal transmission obtained as above, the terminal 120 may transmit the uplink control signal to the base station 110. As state above, if the carrier for the transmission of the uplink control information is indicated, overhead of the information contained in the DCI may reduce.

According to various embodiments described above, the base station may determine a mode indicating the carrier for the transmission of the uplink control signal of the terminal, and the terminal may identify the carrier for the transmission of the uplink control signal according to the determined mode, and transmit the uplink control signal. Herein, the uplink control signal may include HARQ ACK/NACK. The HARQ ACK/NACK is the uplink control information indicating whether the received downlink data is successfully decoded, wherein a transmit timing should be controlled adequately.

The terminal receiving a downlink signal in the conventional system transmits a HARQ ACK signal to the base station at a preset timing. By contrast, the system according to various embodiments does not fixedly define the timing for transmitting the HARQ ACK signal, and may adopt a scheme for dynamically indicating the timing information to the terminal. For example, the base station may include timing information for feeding back the HARQ ACK signal into DCI, and the terminal may obtain the timing information from the DCI, and feed back the HARQ ACK signal according to the timing indicated by the base station.

Meanwhile, since the terminal performs the blind detection on the DCI, increasing the number of the candidates of the DCI format may impose a heavy burden in terms of complexity of the terminal. For this reason, it is not advantageous to change a length of the DCI according to the indication information in the DCI. To prevent the length change of the DCI, the bit field size of the HARQ ACK timing information indicated in the DCI may be fixed. However, the size of the bit field may vary greatly depending on the subcarrier spacing of the carrier for the transmission of the uplink control signal, the duplex scheme, the downlink/uplink configuration, and so on.

Figure 9A:
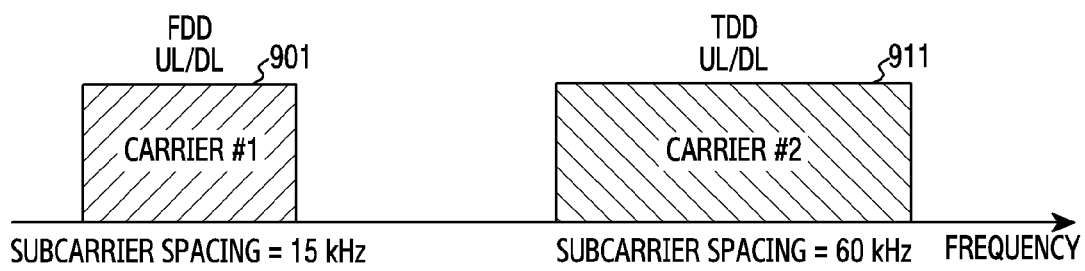
FIG. 9A illustrates an example of two uplink subcarriers in a wireless communication system according to various embodiments of the present disclosure.

FIG. 9A illustrates an example of two uplink subcarriers in a wireless communication system according to various embodiments of the present disclosure. Referring to FIG. 9A, an uplink carrier #1 901 may adopt the subcarrier spacing of 15 kHz and the FDD scheme, and the other uplink carrier #2 911 may adopt the subcarrier spacing of 60 kHz and the TDD scheme. In addition, the downlink carrier 911 may adopt the subcarrier spacing of 60 kHz and the TDD scheme. At this time, if a period of two slots (e.g., 14 OFDM symbols) is required based on the 60 kHz subcarrier spacing to receive the downlink signal and to generate a HARQ ACK signal, a HARQ ACK timing may be shown in FIG. 9B.

Figure 9B:
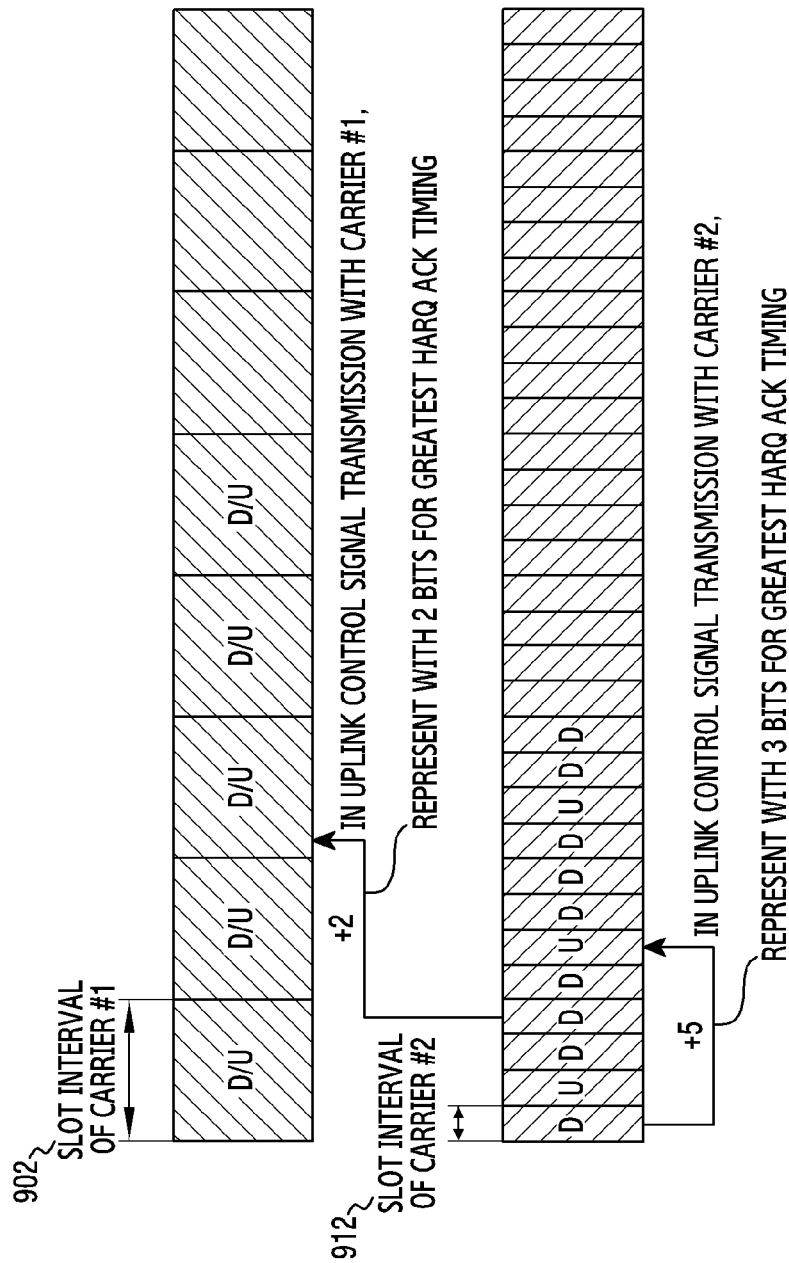
FIG. 9B illustrates an example of an acknowledge (ACK) feedback timing through two uplink subcarriers in a wireless communication system according to various embodiments of the present disclosure.

FIG. 9B illustrates an example of an ACK feedback timing through two uplink subcarriers in a wireless communication system according to various embodiments of the present disclosure. Referring to FIG. 9B, if transmitting an uplink control signal with the carrier #1 901, an HARQ ACK timing bit field of the slot basis required to indicate the transmit timing of the HARQ ACK for the downlink data received over the carrier #2 911 may be 2 bits. However, if transmitting the uplink control signal with the carrier #2 911, the HARQ ACK timing bit field of the slot basis required to indicate the transmit timing of the HARQ ACK for the downlink data received over the carrier #2 911 may be greater than 2 bits according to uplink/downlink configuration of the carrier #2 911.

If uplink carrier information for uplink control signal transmission is indicated with the DCI according to the dynamic indication mode, the terminal may not know which carrier is the carrier for the transmission of the uplink control signal before detecting the DCI. Hence, it is not easy to optimize the size of the HARQ ACK timing bit field included in the DCI. If the size of the HARQ ACK timing bit field is set for the worst case, some of the corresponding bit field may not be used in most cases. This may significantly increase overhead of the DCI. If the size of the HARQ ACK timing bit field is defined based on the reference carrier, the overhead of the DCI may be greatly reduced but a situation where the HARQ ACK timing may not be indicated may occur at times. To solve the above problems, the present disclosure suggests an embodiment as shown in FIG. 10 and FIG. 11.

Figure 10:
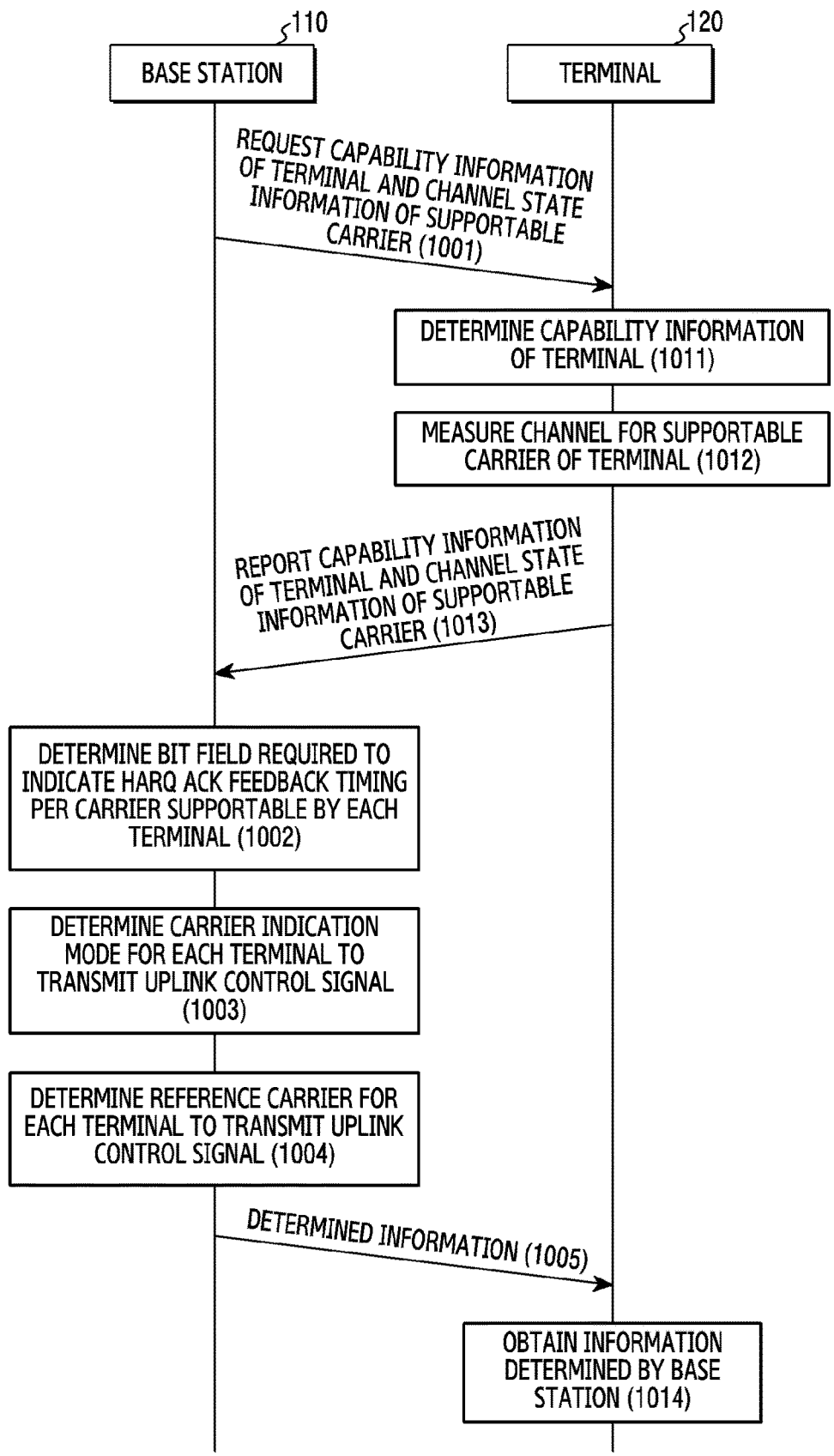
FIG. 10 illustrates signal exchange for determining a scheme for indicating a carrier for uplink control information transmission and a field for indicating an ACK feedback timing in a wireless communication system according to various embodiments of the present disclosure.
Figure 11:
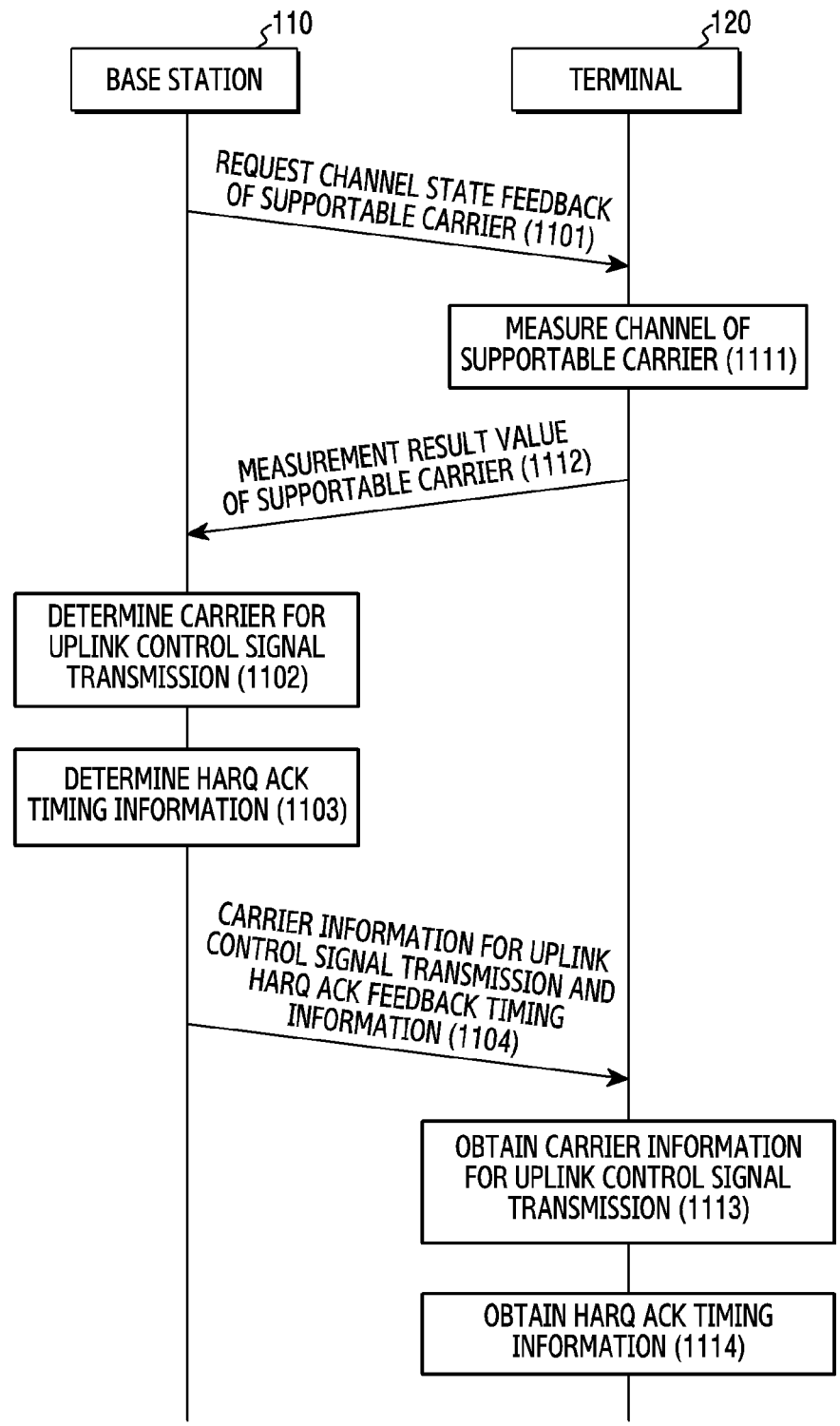
FIG. 11 illustrates signal exchange for indicating a carrier for uplink control information transmission in a wireless communication system according to various embodiments of the present disclosure.

FIG. 10 illustrates signal exchange for determining a scheme for indicating a carrier for uplink control information transmission and a field for indicating an ACK feedback timing in a wireless communication system according to various embodiments of the present disclosure. FIG. 10 is an example of an RRC or MAC CE transmission procedure, if the stepwise signaling is applied in the dynamic indication mode.

Referring to FIG. 10, in step 1001, the base station 110 may request the terminal 120 to report capability information of the terminal 120 and channel state information per supportable carrier. Herein, the capability information of the terminal 120 may include at least one of whether uplink CA is supported, supportable carrier information, supportable subcarrier spacing of each carrier, a duplex scheme applicable to each carrier, and simultaneous transmission capability for a plurality of carriers in CA application. Herein, the channel state may include at least one of CQI, RSRP, RSRQ, and SINR. In step 1013, the terminal 120 performs HARQ ACK feedback through the supportable uplink carrier.

In step 1002, the base station 110 may determine a size of a bit field required to indicate an HARQ ACK feedback timing. The size of the bit field required to indicate the HARQ ACK feedback timing may be determined based on at least one of the subcarrier spacing of the carrier for the transmission of the uplink control signal, the duplex scheme, and downlink/uplink configuration.

In step 1003, the base station 110 may determine a mode for indicating the carrier to be used by each terminal 120 to transmit an uplink control signal based on the capability information reported by the terminal 120. Herein, the mode indicating the carrier to be used by the terminal 120 for the uplink control signal transmission may be one of the static mode, the semi-static indication mode, and the dynamic indication mode. In step 1005, the base station 110 may determine the indication mode for the carrier to use for the uplink control signal transmission to be applied to each terminal 120 based on the capability information of the terminal 120 reported by the terminal 120. Specific details of determining the indication mode have been described with reference to FIG. 7 and thus shall be omitted.

In step 1004, the base station 110 may determine a reference carrier to be used by each terminal 120 to transmit the uplink control signal based on the capability information reported by the terminal 120 and channel state information per supportable carrier. By detecting the capability information reported by the terminal 120, the base station 110 may recognize the uplink carrier supportable by the terminal 120, the duplex scheme supported in each carrier, the subcarrier spacing applied to each carrier, and so on.

According to one embodiment, the base station 110 may detect the channel state information per carrier reported by the terminal 120 and thus determine the carrier of the best channel state among the supportable carriers per terminal 120 as the reference carrier for transmitting the uplink control signal. According to another embodiment, the base station 110 may select the fastest carrier which may adopt the HARQ ACK feedback timing using the capability information reported by each terminal 120 and thus determine it as the reference carrier for transmitting the uplink control signal. According to another embodiment, the base station 110 may determine the carrier of the best channel state among the supportable carriers which may set the HARQ ACK feedback timing below a reference value as the reference carrier for transmitting the uplink control signal using the capability information reported by each terminal 120 and the channel state information per supportable carrier. Herein, the reference carrier may be changed according to change of the capability information of the terminal 120 and the channel state information per supportable carrier.

In step 1005, the base station 110 may transmit to the terminal 120 size information of the bit field required to indicate the HARQ ACK feedback timing determined per supportable uplink carrier of the terminal 120. That is, the size information may represent size values as many as the supportable uplink carriers. Herein, the base station 110 may transmit to the terminal 120 an RRC signal including the size information of the bit field required to indicate the HARQ ACK feedback timing determined per supportable uplink carrier of the terminal 120. Here, the base station 110 may transmit to the terminal 120 MAC CE including the size information of the bit field required to indicate the HARQ ACK feedback timing determined per supportable uplink carrier of the terminal 120. According to another embodiment, the base station 110 may transmit only the size information of the bit field required to indicate the HARQ ACK feedback timing corresponding to the current reference carrier.

Further, in step 1005, the base station 110 may transmit to each terminal 120 the carrier indication mode for the uplink transmission per each terminal 120 determined as described above. Herein, to transmit the carrier indication mode for the uplink transmission of the terminal 120 to the terminal 120, the base station 110 may transmit corresponding information using an RRC signal. Herein, to transmit to the terminal 120 the carrier indication mode for the uplink transmission of the terminal 120, the base station 110 may transmit MAC CE including corresponding information.

In addition, in step 1005, the base station 110 may transmit to each terminal 120 reference carrier information for the uplink transmission per each terminal 120 determined as described above. For example, the base station 110 may transmit the reference carrier information for the uplink transmission of the terminal 120 using an RRC signal or a MAC CE.

Referring to FIG. 10, operations of the terminal 120 are as follows. The terminal 120 may determine capability information of the terminal 120 at a request of the base station 110 in step 1011, and measure a channel per supportable carrier in step 1012. In step 1013, the terminal 120 may report channel measurement results per supportable carrier and the capability information to the base station 110. Herein, the capability information of the terminal 120 may include at least one of whether uplink CA is supported, supportable carrier information, supportable subcarrier spacing of each carrier, a duplex scheme applicable to each carrier, and simultaneous transmission capability for a plurality of carriers in CA application. Herein, the channel state may include at least one of CQI, RSRP, RSRQ, and SINR.

In step 1014, the terminal 120 may obtain size information transmitted from the base station 110 of a bit field required to indicate an HARQ ACK feedback timing per uplink carrier supportable by the terminal 120. That is, the size information may represent size values as many as the supportable uplink carriers. Herein, the terminal 120 may detect an RRC message and obtain the size information of the bit field required to indicate the HARQ ACK feedback timing per supportable uplink carrier. Herein, the terminal 120 may detect a MAC CE message and obtain the size information of the bit field required to indicate the HARQ ACK feedback timing per supportable uplink carrier. According to another embodiment, the base station 110 may transmit only the size information of the bit field required to indicate the HARQ ACK feedback timing corresponding to the current reference carrier.

In addition, in step 1014, the terminal 120 may obtain the carrier indication mode information for the uplink transmission per each terminal 120 transmitted from the base station 110. Herein, the terminal 120 may detect an RRC message and obtain the carrier indication mode information for the uplink transmission. Herein, the terminal 120 may detect a MAC CE signal and obtain the carrier indication mode information for the uplink transmission.

In addition, in step 1014, the terminal 120 may obtain reference carrier information for the uplink transmission per each terminal 120 transmitted from the base station 110. For example, the terminal 120 may detect an RRC message or a MAC CE message and obtain the reference carrier information for the uplink transmission.

FIG. 11 illustrates signal exchange for indicating a carrier for uplink control information transmission in a wireless communication system according to various embodiments of the present disclosure. FIG. 11 is an example of a DCI transmission procedure, if the stepwise signaling is applied in the dynamic indication mode.

Referring to FIG. 11, in step 1101, the base station 110 may request feedback of a channel state from the terminal 120. In step 1102, the base station 110 may determine a carrier for transmission of an uplink control signal based on channel state information received from the terminal 120 and service requirements of the corresponding terminal 120. In step 1103, the base station 110 may determine HARQ ACK timing information by reflecting carrier information for the transmission of the uplink control signal of the terminal 120. In step 1104, the base station 110 may transmit the carrier information for transmitting the uplink control signal and the HARQ ACK feedback timing information to the terminal 120 using the DCI. In this case, embodiments for determining the HARQ ACK timing information are as follows.

According to one embodiment, if the subcarrier spacing of the reference carrier is greater than the assistant carrier and the base station 110 determines the carrier for the transmission of the uplink control signal as the reference carrier, the HARQ ACK feedback timing information may be determined on the slot basis of the reference carrier. In addition, the base station 110 may reflect the downlink/uplink configuration of the reference carrier, and determine the HARQ ACK feedback timing of the terminal 120 by considering a time taken for the terminal 120 to process a downlink signal.

According to another embodiment, if the subcarrier spacing of the reference carrier is greater than the assistant carrier and the base station 110 determines the carrier for the transmission of the uplink control signal as the assistant carrier, the HARQ ACK feedback timing information may be determined on the slot basis of the assistant carrier. In addition, the base station 110 may reflect the downlink/uplink configuration of the reference carrier, and determine the HARQ ACK feedback timing of the terminal 120 by considering the time taken for the terminal 120 to process the downlink signal. At this time, the bit field for the HARQ ACK timing information of the DCI may be great enough to represent the HARQ ACK feedback timing information, and at least one remaining bit may not be used.

According to yet another embodiment, if the subcarrier spacing of the reference carrier is smaller than the assistant carrier and the base station 110 determines the carrier for the transmission of the uplink control signal as the reference carrier, the HARQ ACK feedback timing information may be determined on the slot basis of the reference carrier. In addition, the base station 110 may reflect the downlink/uplink configuration of the reference carrier, and determine the HARQ ACK feedback timing of the terminal 120 by considering the time taken for the terminal 120 to process the downlink signal.

Figure 12A:
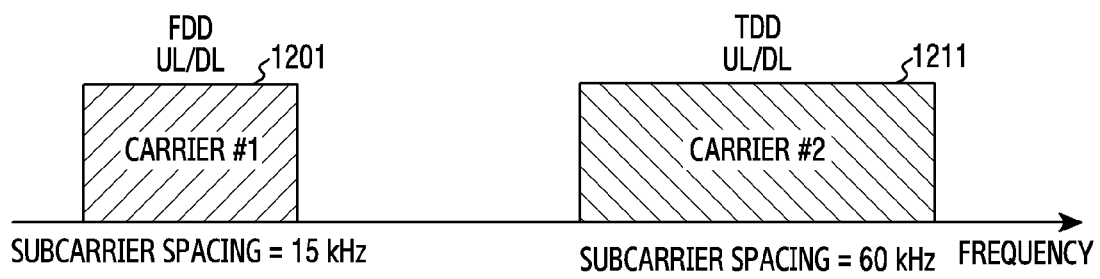
FIG. 12A illustrates an example of two uplink subcarriers in a wireless communication system according to various embodiments of the present disclosure.
Figure 12B:
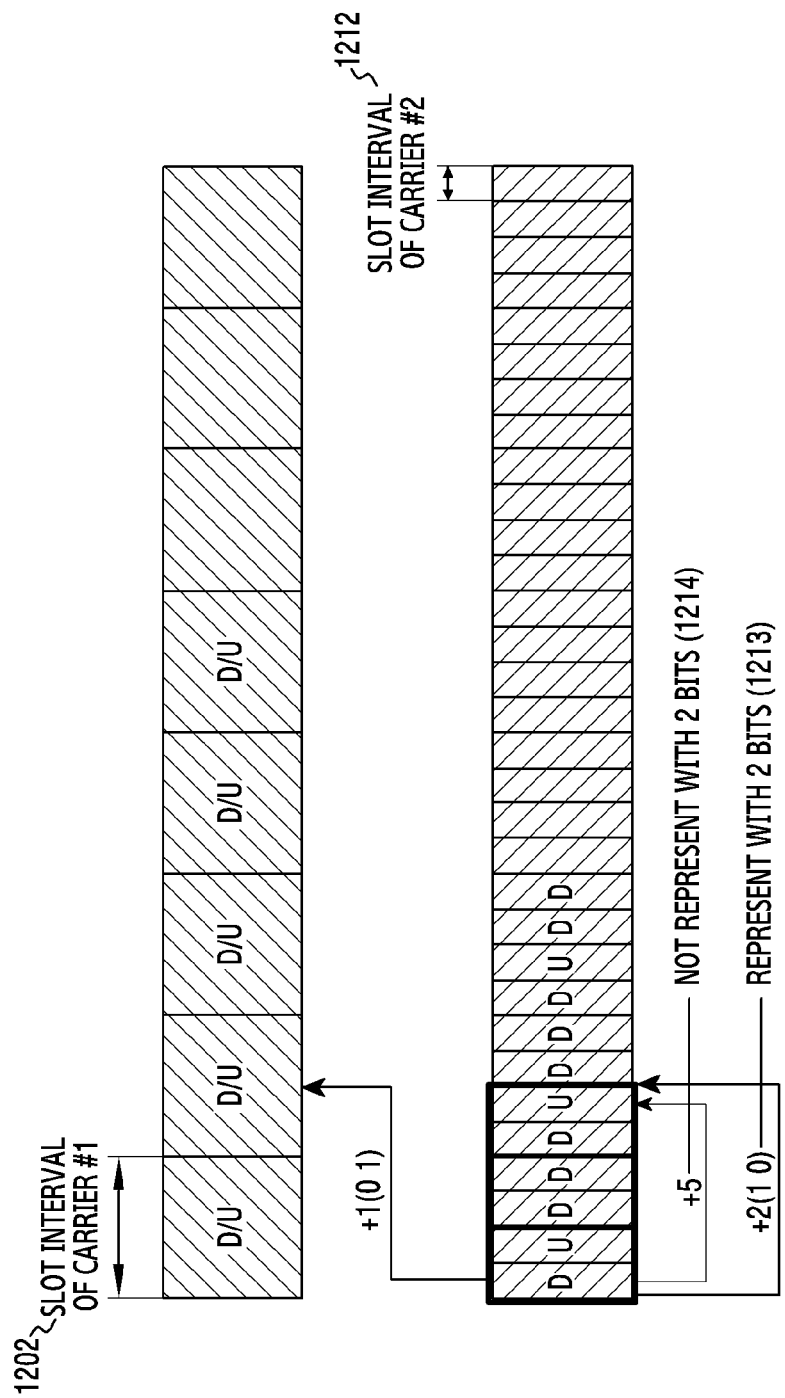
FIG. 12B illustrates an example of an ACK feedback timing through two uplink subcarriers in a wireless communication system according to various embodiments of the present disclosure.

As another example, if the subcarrier spacing of the reference carrier is smaller than the assistant carrier and the base station 110 determines the carrier for the transmission of the uplink control signal as the assistant carrier, the HARQ ACK feedback timing information may be determined on N slot basis of the assistant carrier. For example, as shown in FIG. 12A, an uplink carrier #1 1201 adopts the subcarrier spacing of 15 kHz and the FDD scheme, the other uplink carrier #2 1211 adopts the subcarrier spacing of 60 kHz and the TDD scheme, and the downlink carrier 1211 adopts the subcarrier spacing of 60 kHz and the TDD scheme, the HARQ ACK feedback timing information may be determined on two-slot basis of the assistant carrier, as shown in a situation 1213 of FIG. 12B. This is because the size of the bit field for the HARQ ACK feedback timing information defined in the DCI, which is set to be suitable for the reference carrier, may not represent a great value of the HARQ ACK feedback timing for the assistant carrier, as shown in a situation 1213 of FIG. 12B.

Herein, the base station 110 may transmit the value N to the terminal 120 using an RRC message or a MAC CE. Also, the downlink/uplink configuration of the reference carrier may be reflected, and the HARQ ACK feedback timing of the terminal 120 may be determined based on the time taken for the terminal 120 to process the downlink signal. To support the above HARQ ACK feedback timing indication method, the base station 110 may predefine a rule for grouping slots of the assistant carrier by N, and transmit rule information to the terminal 120 through the RRC or the MAC CE.

To support the above HARQ ACK feedback timing indication method, the base station 110 may define at least one uplink slot per slot group including N slots of the assistant carrier. In addition, the base station 110 may transmit information relating to the uplink slot per group to the terminal 120 statically or semi-statically, or through the RRC or the MAC CE.

To support the above HARQ ACK feedback timing indication method, the base station 110 may define an uplink slot for uplink control channel transmission including at least one HARQ ACK feedback signal per slot group including N slots of the assistant carrier. This may be applied if there is a plurality of uplink slots in the slot group. In addition, the base station 110 may transmit information relating to the uplink slot per group to the terminal 120 statically or semi-statically, or through the RRC or the MAC CE.

The terminal 120 operations are as follows by referring to FIG. 11. In step 1111, the terminal 120 measures a channel of a supportable carrier at a request of the base station 110. In step 1112, the terminal 120 may report measurement results to the base station 110. In step 1113, the terminal 120 may obtain the carrier information for the uplink control signal transmission and the HARQ ACK timing information transmitted by the base station 110 by detecting a DCI. In this case, embodiments for interpreting the ACK feedback timing information are as follows.

According to one embodiment, if the subcarrier spacing of the reference carrier is greater than the assistant carrier and the carrier for the transmission of the uplink control signal transmitted by the base station 110 is the reference carrier, the HARQ ACK feedback timing information may be interpreted on the slot basis of the reference carrier.

According to another embodiment, if the subcarrier spacing of the reference carrier is greater than the assistant carrier and the carrier for the transmission of the uplink control signal transmitted by the base station 110 is the assistant carrier, the HARQ ACK feedback timing information may be interpreted on the slot basis of the assistant carrier. According to other embodiment, if the subcarrier spacing of the reference carrier is smaller than the assistant carrier and the carrier for the transmission of the uplink control signal transmitted by the base station 110 is the reference carrier, the HARQ ACK feedback timing information may be interpreted on the slot basis of the reference carrier. According to yet another embodiment, if the subcarrier spacing of the reference carrier is smaller than the assistant carrier and the carrier for the transmission of the uplink control signal transmitted by the base station 110 is the assistant carrier, the HARQ ACK feedback timing information may be interpreted on the N slot basis of the assistant carrier. Herein, the value N may be acquired by detecting an RRC message or a MAC CE signal.

To support the above HARQ ACK feedback timing indication method, the base station 110 may predefine a rule for grouping slots of the assistant slot by N, and notify the defined rule to the terminal 120 through the RRC or the MAC CE. In this case, the terminal 120 may identify the rule by detecting the RRC or the MAC CE.

To support the above HARQ ACK feedback timing indication method, the base station 110 may define at least one uplink slot per slot group including N slots of the assistant carrier, and the terminal 120 may acquire information relating to the uplink slot per group by detecting the RRC or the MAC CE.

To support the above HARQ ACK feedback timing indication method, the base station 110 may define an uplink slot for uplink control channel transmission including at least one HARQ ACK feedback signal per slot group including N slots of the assistant carrier. This may be applied if there is a plurality of uplink slots in the slot group. In addition, the terminal 120 may acquire information relating to the uplink slot for the uplink control channel transmission by detecting the RRC or the MAC CE.

In the embodiments described above in reference to FIG. 10 through FIG. 12B, additional information relating to the size of the ACK feedback timing information may be transmitted from the base station to the terminal. The information indicating the ACK timing may be interpreted differently depending on at least one of the subcarrier spacing of the uplink carriers each used for the CA, and the carrier for the transmission of the uplink control information. Hence, if the dynamic indication mode is selected, the blind decoding complexity of the DCI due to the unknown size of ACK feedback timing may reduce.

According to another embodiment, even in the static indication mode or the semi-static indication mode, the additional information relating to the size of the ACK feedback timing information may be transmitted from the base station to the terminal. For example, information relating to the size of the ACK feedback timing information may be delivered through an RRC message or a MAC CE indicating the carrier for the transmission of the uplink control signal. Thus, even in the static indication mode or the semi-static indication mode, the blind decoding complexity of the DCI due to the unknown size of ACK feedback timing may reduce.

According to yet another embodiment, in the static indication mode or the semi-static indication mode, the terminal may determine the size of the ACK feedback timing information without explicit signaling. The size of the ACK feedback timing information depends on the carrier or the reference carrier for the transmission of the uplink control signal. In the static indication mode or the semi-static indication mode, since the terminal knows the carrier or the reference carrier for the transmission of the uplink control signal before the blind decoding of the DCI, the size of the ACK feedback timing information may be estimated based on the carrier or the reference carrier for the transmission of the uplink control signal.

The methods according to the embodiments described in the claims or the specification of the present disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory which combines part or all of them. Also, a plurality of memories may be included.

Also, the programs may be stored in an attachable storage device accessible via a communication network such as Internet, Intranet, local area network (LAN), wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to certain embodiments thereof, but various modifications may be made without departing from the scope of this disclosure. Therefore, the scope of this disclosure should not be limited to the described embodiments but should be defined by the claims as below and their equivalents within the scope of the claims.

The invention claimed is:

1. A method for operating a terminal in a wireless communication system, comprising:

transmitting, to a base station, capability information including information indicating whether a dynamic switching between an uplink carrier and an auxiliary uplink carrier using downlink control information (DCI) is supported or not and information indicating whether a simultaneous transmission via the uplink carrier and the auxiliary uplink carrier is supported or not;

receiving, from the base station, information on a carrier indicating mode determined based on the capability information;

identifying whether the carrier indicating mode is a carrier dynamic indicating mode;

transmitting, to the base station, information on a channel measurement for at least one carrier supported by the terminal;

receiving, from the base station, a radio resource control (RRC) message for configuring the uplink carrier and the auxiliary uplink carrier, wherein the RRC message includes information on a first subcarrier spacing of the uplink carrier and information on a second subcarrier spacing of the auxiliary uplink carrier;

receiving, from the base station, the DCI including an indication indicating at least one of the uplink carrier or the auxiliary uplink carrier for a transmission carrier, wherein the indication is determined based on the information on the channel measurement;

identifying a DCI format based on the carrier dynamic indicating mode and the received DCI;

decoding the identified DCI format including information on the transmission carrier;

identifying a subcarrier spacing corresponding to the transmission carrier based on the RRC message; and transmitting, to the base station, an uplink signal via the uplink carrier or the auxiliary uplink carrier for the transmission carrier indicated by the DCI, based on the identified subcarrier spacing corresponding to the transmission carrier.

2. The method of claim 1, further comprising:
receiving timing information including a size of bit field for indicating an acknowledge (ACK) timing.

3. The method of claim 2, wherein the size of bit field for indicating the ACK timing is determined based on the subcarrier spacing corresponding to the transmission carrier.

4. A method for operating a base station in a wireless communication system, comprising:

receiving, from a terminal, capability information including information indicating whether a dynamic switching between an uplink carrier and an auxiliary uplink carrier using downlink control information (DCI) is supported or not and information indicating whether a simultaneous transmission via the uplink carrier and the auxiliary uplink carrier is supported or not;

determining a carrier indicating mode is a carrier dynamic indicating mode based on the capability information;

transmitting, to the terminal, information on the carrier indicating mode determined as the carrier dynamic indicating mode;

receiving, from the terminal, information on a channel measurement for at least one carrier supported by the terminal;

determining an indication indicating at least one of the uplink carrier and the auxiliary uplink carrier based on the information on the channel measurement;

transmitting, to the terminal, a radio resource control (RRC) message for configuring the uplink carrier and the auxiliary uplink carrier, wherein the RRC message includes information on a first subcarrier spacing of the uplink carrier and information on a second subcarrier spacing of the auxiliary uplink carrier;

transmitting, from the terminal, the DCI including the indication indicating one of the uplink carrier or the auxiliary uplink carrier for a transmission carrier; and receiving, from the terminal, an uplink signal via the uplink carrier or the auxiliary uplink carrier for the transmission carrier indicated by the DCI, based on a subcarrier spacing corresponding to the transmission carrier, wherein the subcarrier spacing corresponding to the transmission carrier is identified by the terminal based on the RRC message, and wherein a DCI format including information on the transmission carrier is identified by the terminal based on the carrier dynamic indicating mode and the transmitted DCI.

5. The method of claim 4, further comprising:
transmitting timing information including a size of bit field indicating an acknowledge (ACK) timing.

6. The method of claim 5, wherein
the size of bit field for indicating the ACK timing is determined based on the subcarrier spacing corresponding to the transmission carrier.

7. An apparatus of a terminal in a wireless communication system, comprising:

a transceiver; and at least one processor operably coupled to the transceiver, and configured to:

transmit, to a base station, capability information including information indicating whether a dynamic switching between an uplink carrier and an auxiliary uplink carrier using downlink control information (DCI) is supported or not and information indicating whether a simultaneous transmission via the uplink carrier and the auxiliary uplink carrier is supported or not;

receive, from the base station, a radio resource control (RRC) message for configuring the uplink carrier and the auxiliary uplink carrier, wherein the RRC message includes information on a first subcarrier spacing of the uplink carrier and information on a second subcarrier spacing of the auxiliary uplink carrier;

receive, from the base station, information on a carrier indicating mode determined based on the capability information;

identify whether the carrier indicating mode is a carrier dynamic indicating mode;

transmit, to the base station, information on a channel measurement for at least one carrier supported by the terminal;

receive, from the base station, the DCI including an indication indicating at least one of the uplink carrier or the auxiliary uplink carrier for a transmission carrier, wherein the indication is determined based on the information on the channel measurement;

identify a DCI format based on the carrier dynamic indicating mode and the received DCI;

decode the identified DCI format including information on the transmission carrier;

identify a subcarrier spacing corresponding to the transmission carrier, based on the RRC message; and transmit, to the base station, an uplink signal via the uplink carrier or the auxiliary uplink carrier for the transmission carrier indicated by the DCI, based on the identified subcarrier spacing corresponding to the transmission carrier.

8. The terminal of claim 7, wherein the at least one processor further configured to receive timing information including a size of bit field for indicating an acknowledge (ACK) timing.

9. The terminal of claim 8, wherein the size of bit field for indicating the ACK timing is determined based on the subcarrier spacing corresponding to the transmission carrier.

10. An apparatus of a base station in a wireless communication system, comprising:
a transceiver; and
at least one processor operably coupled to the transceiver, and configured to:
   receive, from a terminal, capability information including information indicating whether a dynamic switching between an uplink carrier and an auxiliary uplink carrier using downlink control information (DCI) is supported or not and information indicating whether a simultaneous transmission via the uplink carrier and the auxiliary uplink carrier is supported or not;
   determine a carrier indicating mode is a carrier dynamic indicating mode based on the capability information;
   transmit, to the terminal, information on the carrier indicating mode determined as the carrier dynamic indicating mode;
   receive, from the terminal, information on a channel measurement for at least one carrier supported by the terminal;
   determine an indication indicating at least one of the uplink carrier and the auxiliary uplink carrier based on the information on the channel measurement;
   transmit, to the terminal, a radio resource control (RRC) message for configuring the uplink carrier and the auxiliary uplink carrier, wherein the RRC message includes information on a first subcarrier spacing of the uplink carrier and information on a second subcarrier spacing of the auxiliary uplink carrier;
   transmit, from the terminal, the DCI including the indication indicating one of the uplink carrier or the auxiliary uplink carrier for a transmission carrier; and
   receive, from the terminal, an uplink signal via the uplink carrier or the auxiliary uplink carrier for the transmission carrier indicated by the DCI, based on a subcarrier spacing corresponding to the transmission carrier,
wherein the subcarrier spacing corresponding to the transmission carrier is identified by the terminal based on the RRC message, and
wherein a DCI format including information on the transmission carrier is identified by the terminal based on the carrier dynamic indicating mode and the transmitted DCI.

11. The base station of claim 10, wherein the at least one processor is further configured to transmit timing information including a size of bit field indicating an acknowledge (ACK) timing.

12. The base station of claim 11, wherein the size of bit field for indicating the ACK timing is determined based on the subcarrier spacing corresponding to the transmission carrier.

* * * * *